Nov. 21, 1967  W. H. PERCIVAL  3,353,349
UNDERWATER PROPULSION SYSTEM
Filed Sept. 26, 1966

INVENTOR.
Worth H. Percival
BY
Peter P. Kozak
ATTORNEY

United States Patent Office 3,353,349
Patented Nov. 21, 1967

3,353,349
UNDERWATER PROPULSION SYSTEM
Worth H. Percival, Grosse Pointe Woods, Mich., assignor to General Motors Corporation, Detroit, Mich., a corporation of Delaware
Filed Sept. 26, 1966, Ser. No. 582,091
5 Claims. (Cl. 60—37)

ABSTRACT OF THE DISCLOSURE

An efficient closed cycle thermal engine is provided with a combustion system for heating the working gas thereof, which combustion system produces nongaseous byproducts and operates at substantially constant volume, by employing molten lithium or sodium as a fuel and certain gaseous nonhydrogen containing Freon-type fluorocarbon compounds as the oxidizer.

This invention relates to a combustion system heat source for use in a closed cycle thermal engine. More specifically it relates to a combustion system capable of producing a relatively large amount of thermal energy per unit weight and volume in a confined environment, such as underwater, from which no gaseous reaction products are formed and in which the volume of the combustion mixture and byproducts remains substantially constant during the operation of the thermal engine.

Closed cycle thermal engines adapted to operate in accordance with known thermodynamic cycles have been available for many years. This class of thermal engines employs a working gas which undergoes expansion and contraction in response to changes in temperature and pressure but which is not exhausted from the engine. During one phase in the cycle of the engine, heat is applied to the working gas from an external source and during a different phase heat is exhausted therefrom. In traversing its cycle from a relatively high temperature and pressure to a relatively low temperature and pressure, work is performed by the engine. Within the limits of the physical and chemical properties of the materials of construction of the engine the specific manner in which heat is supplied to the working gas of the closed cycle thermal engine is more or less independent of the engine itself. For closed cycle external combustion engines that operate above ground, the heat may be supplied by the burning of natural gas, gasolene, diesel fuel or other hydrocarbon fuels which generate gaseous byproducts as a result of the combustion. However, when the closed cycle engine is to be operated in a confined area, underground or underwater, it is much more difficult to dispose of gaseous byproducts of the combustion source. In fact, it may even require work to pump the byproducts out of the vehicle in which the engine is located thus reducing the available useful power. Moreover, since the fuel and oxidizer of the heat source may in themselves be toxic or otherwise dangerous to human beings in confined quarters, the selection of a suitable fuel becomes critical.

Accordingly, it is an object of this invention to provide a heat source for a submerged or enclosed environment closed cycle thermal engine.

It is another object of this invention to provide a combustion system heat source for use in combination with a closed cycle thermal engine wherein the combustion system is operated at a relatively low pressure above normal atmospheric pressure and substantially constant volume at a temperature above about 1000° F.

It is a further object of this invention to provide a combustion system for use as a heat source in combination with a closed cycle thermal engine which combustion system employs molten lithium or sodium metal fuel and a reactive fluorine-containing gaseous oxidizer of the Freon type organic compound.

It is still another object of this invention to provide a combustion system which generates byproducts which are soluble in or mix with molten lithium or sodium metal fuel such that the fluidity and heat transmission properties of the combustion system are not adversely affected.

It is also an object of this invention to provide a method of heating a working gas in a closed cycle thermal engine whereby the working gas receives heat from a reacting mixture of molten lithium or sodium and a gaseous fluorine-containing compound of the Freon type.

These and other objects are accomplished in accordance with my invention by providing a molten alkali metal bath comprised of either lithium or sodium in a suitable container and by passing the working gas, either directly or within a suitable conduit, through the bath of molten alkali metal. The metal is maintained in the molten state and an at elevated temperature suitable for the efficient operation of the heat engine by chemical reaction with a fluorine-containing oxidizer. The oxidizer, preferably in gaseous form, reacts with the lithium or sodium to generate large amounts of heat per unit weight and unit volume of the reactants. The composition of the oxidizer is unique both with respect to the amount of energy that is obtained and with respect to the nature of the byproducts that are generated and the safety and handling characteristics of the oxidizer. The oxidizer is comprised of one or more compounds selected from the group consisting of the halogenated aliphatic hydrocarbon gases commonly known as Freons. Not all of the Freons are suitable for use in accordance with my invention, but more specifically just those which may contain chlorine and fluorine in the molecule in addition to carbon and in which the number of fluorine atoms per molecule is at least equal to or preferably greater than the number of chlorine atoms. Moreover, it is preferred that the oxidizer used in accordance with my invention be capable of being liquefied at a relatively low pressure at or about room temperature. In this way the gas may be carried in the more dense liquid form until it is vaporized just prior to or simultaneously with its contacting the molten lithium or sodium metal fuel. The byproducts of my combustion reaction are in general comprised of the respective alkali metal halide salts and graphite or lithium carbide all of which are solid or liquids at the temperature of reaction. No appreciable change in the volume of the reaction system is incurred and the reaction takes place at pressures within a few pounds per square inch of normal atmospheric pressure.

These and other objects of my invention will become more apparent after a detailed description thereof which follows, reference being made to the attached drawings in which.

A number of thermal engines have been devised which are based on known thermodynamic cycles such as for example, the Stirling cycle, the Brayton (gas turbine) cycle, and the Rankin cycle. These various thermodynamic cycles are all characterized by the fact that heat is transmitted to working gas of the engine at a relatively high temperature and discharged by the engine at a lower temperature. In proceeding from the high temperature to the lower temperature, useful work may be obtained from the engine. In most applications, the sources and means by which heat is supplied to the engine at the higher temperature may be selected from a large number of possible choices and no particular difficulty is encountered.

However, in closed environments, such as underground or underwater, problems of disposal of heat source reaction products, of safety and of noise level become much more important. In general, thermal engines operating in such an environment require a combustion system heat source which provides high temperature reaction products with relatively large amounts of thermal energy per unit volume and unit weight of combustion components. Moreover, the high temperature reaction products cannot ideally occupy more volume than the fuel from which they came. Preferably both the oxidizer and fuel are relatively safe to handle and are not bulky nor require containers capable of withstanding high pressures or maintaining cryogenic temperatures. It is in this application that my invention finds particular utility.

My heat source could be adapted for use in conjunction with nearly any closed cycle heat engine which operates at elevated temperatures. However, for purposes of illustration it will be described in conjunction with a Stirling cycle engine and a gas turbine-type engine. Because of the high thermal efficiency of the Stirling-type engine, the combination of this engine with my heat source is a highly efficient and compact power plant for use in closed environments and for this reason it is a preferred embodiment of my invention.

Figure 1:
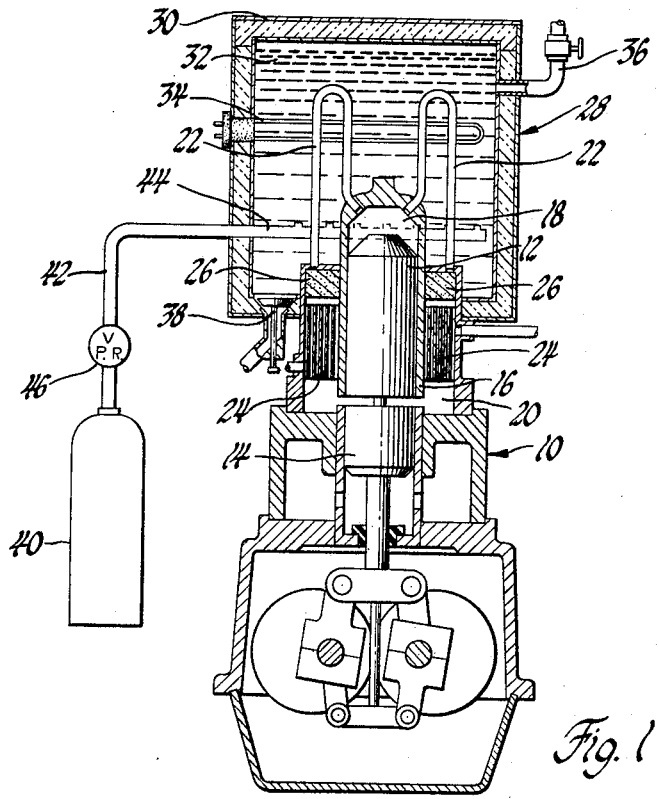
FIGURE 1 is a schematic representation of a Stirling-type engine incorporating the combustion heat source of my invention.

In FIGURE 1 is illustrated schematically a Stirling-type thermal engine in combination with my combustion system. As shown a Stirling thermal engine 10 has two pistons 12 and 14 which oscillate out of phase in a cylinder 16. For simplicity of illustration only one cylinder is shown in the embodiment of FIGURE 1, but of course, the engine may be comprised of two or more cylinders. The upper piston or displacer piston 12 operates to transfer a working gas back and forth between an upper hot space 18 and a lower cold space 20. The lower piston 14 or power piston controls the total volume of the system compressing the working gas while it is in the cold space 20 of the cylinder 16 and allowing it to expand while in the cylinder hot space 18. The working gas may be any suitable gas such as hydrogen or helium. As is well known, the expansion of the high temperature, high pressure working gas in the hot space effects the power stroke of the Stirling engine. Heater tubes 22 and cooler 24 are conduits in which the working gas is alternately heated and cooled. Two regenerators 26 located between heater tubes 22 and cooler 24 store energy when the flow of the working gas is from the top to the bottom and recover energy when the flow is in the opposite direction. Heater tubes 22, which are the situs of energy input to the system, are heated by external means 28, which means is the novel feature of my invention. Power output of the Stirling engine is controlled by varying both the heat input and the mean pressure of the working gas.

In the embodiment as shown in FIGURE 1, the heater tubes 22 of the Stirling engine are immersed in and pass through the external heating means 28. The external heating means in accordance with my invention is comprised of a suitable container or housing 30 in which the lithium metal fuel or sodium metal fuel 32 is located. When the engine is not in operation the fuel may be maintained in the solid state. However, under operating conditions the fuel is in the molten state and maintained at a suitable elevated operating temperature preferably about 1200° F.–1600° F. by the heat of reaction. Prior to starting the combustion reaction the solid fuel may be melted by an electrical immersion heater 34 or other suitable means. The metallic fuel may be added to the container 30 in the molten state through a fill pipe 36. When it is desired to drain the combustion container 30, molten fuel and combustion byproducts may be withdrawn through drain valve 38. When the fuel has been melted and it is desired to commence operation of the engine, oxidizer is fed into the container. In order to better control the reaction temperature and to prevent a dangerous accumulation of oxidizer within the fuel container 30, the oxidizer is preferably fed to the system in gaseous form at a rate such that it is almost instantaneously consumed. The oxidizer is contained in a suitable storage tank 40 and fed to the container 30 through a line 42 and contacted with the molten fuel through a distributor pipe with nozzles 44. The rate of addition of the oxidizer may be controlled by the valve pressure regulator 46. Thus the oxidizer gas is fed in the gaseous state and contacted with the molten fuel. At the point of contact between the oxidizer and fuel the heat of the combustion reaction potentially could create a temperature in the order of several thousand degrees. However, due to conduction and convection within the molten fuel a uniform temperature in the range of about 1200° F.–1600° F. or higher is readily maintained. The fluidity of the fuel and the reaction byproducts provides excellent heat transmission to heater tubes 22 thus permitting efficient operation of the engine 10.

A small fractional horsepower Stirling cycle engine was adapted with a suitable housing around its heater tubes as shown in FIGURE 1 and described above. For purposes of experimentation no external load was applied to the engine. The mean pressure of the working gas was approximately atmospheric pressure. A small quantity of liquid lithium was added to the housing or combustion chamber and preheated to about 1000° F. Subsequently dichlorotetrafluoroethane was admitted igniting the lithium. The temperature in the molten lithium rose to approximately 1500° F. at which temperature it was readily maintained by regulating the flow of dichlorotetrafluoroethane. The engine was permitted to run for about 45 minutes at 2000 r.p.m. before the lithium fuel was consumed. Although the lithium and reaction products were maintained at a relatively high temperature the reaction was not violent and the temperature was readily controlled.

Figure 2:
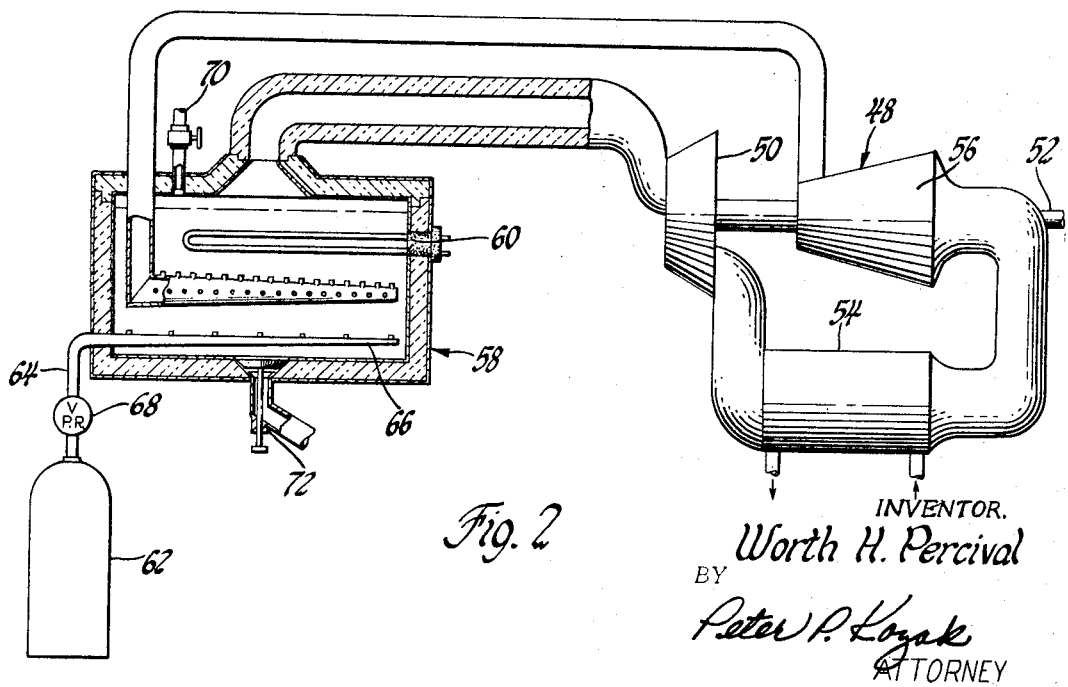
FIGURE 2 is a schematic representation of a gas turbine engine incorporating the heat source of my invention.

In FIGURE 2 a different embodiment is shown illustrating the gas turbine engine 48. This engine is also of the closed cycle type. A working gas is continuously cycled through the engine operating between a relatively high temperature at which heat is fed to the gas and a lower temperature at which heat is discharged from the system. Hot high pressure nonreactive working gas is expanded through a turbine 50 performing useful work at the driveshaft 52. The working gas then passes through a cooler 54 in which it is cooled to a suitable low temperature before being compressed to a high pressure in compressor 56. The high pressure low temperature working gas is then reheated by means of a suitable external source 58 completing the cycle. The heat source 58 is substantially the same as that described in connection with FIGURE 1. However, in this embodiment as shown the working gas is passed directly through the molten fuel, preferably lithium, rather than through tubes immersed in the alkali metal bath. When the working gas is heated in this manner lithium fuel is preferred because the boiling point of lithium is sufficiently high that virtually none is carried out of the heat source by the working gas. As in FIGURE 1 an electric immersion heater 60 is used to melt and heat the lithium to a suitable temperature. The oxidizer gas is contained in a suitable container 62 in the liquid state. The oxidizer container 62 is connected through line 64 to a dispersion pipe having nozzles 66. Pressure regulation means 68 is provided to control the flow of the oxidizer gas. The container is also provided with a suitable fill pipe 70 and drain valve 72.

While it is known that a number of molten metals may be ignited with an appropriate oxidizer to provide thermal energy, I have found that only molten lithium or sodium are suitable in all respects for use in combination with a closed cycle thermal engine which is to be operated in a closed or submerged environment. These metals each possess in combination, a number of properties which uniquely qualify them for use in such an application. Their respective melting points and boiling points are such that they are in the liquid state over the range of temperatures at which most closed cycle thermal engines would be operated. In this respect the melting point of sodium is about 208° F. and its boiling point at one atmosphere is about 1640° F. The melting point of lithium is about 354° F. and its boiling point at one atmosphere is 2403° F. There are also available a number of known and available metals which will contain molten lithium or sodium at temperatures of 1200° F.–1600° F. or even higher for considerable periods of time. Moreover, lithium and sodium form reaction products with the high energy oxidizers of my invention which are solid or liquid at the preferred temperature of operation. Thus, the combustion system is essentially a low pressure system capable of producing a high temperature of operation. The reaction products, depending upon the specific fuel and oxidizer composition, may include sodium chloride, sodium fluoride, lithium chloride, lithium fluoride, carbon, and/or lithium carbide. The density of these materials is such that there is substantially no change in volume of the combustion system. This means that the heating container may be filled with fuel in the first instance to a level adequately covering heating tubes or other suitable heat transfer members, and later during the course of the reaction the level of fuel plus reaction products will not fall, nor will the container overflow. For purposes of maintaining the fluidity and the heat transfer characteristics of the molten metal combustion bath it is usually preferable to provide an excess of the metal fuel, either lithium or sodium. The excess also insures that there is always a sufficient quantity of the fuel readily available for reaction with the oxidizer.

The reaction of lithium with an oxidizer of my invention will produce more energy per unit weight, or per unit volume, than will the same reaction when sodium is employed as the fuel. Moreover, the boiling point of lithium is considerably higher than that of sodium and lithium may thus be used in higher temperature applications without requiring special pressure equipment. In these respects lithium may be considered the preferred fuel. However, the cost of sodium is much less than lithium and in applications where economics are a determining factor, molten sodium may be the preferred fuel.

The oxidizer used in accordance with my invention is gaseous at the temperature of reaction required to drive most closed cycle thermal engines, but it has a critical temperature above room temperature and preferably can be liquefied at room temperature under a pressure less than about 100 pounds p.s.i. gauge. Oxidizers are selected in conjunction with fuels primarily to provide the greatest possible energy per unit volume and weight. In this respect it is known that fluorine would be a most energizable oxidizer for the combustion of lithium or sodium. It would also be an oxidizer which would yield non-gaseous reaction products. However, fluorine is extremely dangerous to handle. Moreover, it is of low density and impossible to maintain in the liquid state at room temperature. For the same reasons most other known oxidizers are unsuitable for use in a submerged or enclosed environment. However, I have discovered that certain of the halogen containing alkane or cycloalkane type organic compounds, commonly known as Freons, may advantageously be used as the oxidizer. Most of the Freons present little or no toxicity hazard to human beings under normal handling conditions. For the most part they are readily condensable into high density liquids at room temperature under moderate pressures. However, the Freon type oxidizer to be used in accordance with my invention should contain no hydrogen in the molecule as some of the by-products of the combustion reaction would be gaseous and could be contained in the enclosed environment only under high pressure. Suitable oxidizer compounds are those Freon type compounds containing only carbon and halogen elements. Moreover, it is preferred that the halogen elements comprise only chlorine and fluorine with a further restriction that the number of fluorine atoms equal or exceed the number of chlorine atoms. In this respect, of course, it is also suitable to have an oxidizer which contains only fluorine and carbon. Bromine may be substituted for chlorine but this results in a substantial reduction in the heat of reaction decreasing the capacity of the power plant. For this reason bromine is not preferred. Thus, the Freon type molecules which are suitable for use as oxidizers in my invention are of the class $C_xCl_yF_z$, wherein $x$ is an integer assuming values of at least one, where $y$ and $z$ are integers and the sum of $y$ and $z$ is a value consistent with the values of $x$ in an alkane or cycloalkane type organic compound. As a further restriction $y$ may be equal to zero and $z$ is either equal to or greater than $y$ but never zero. Examples of suitable compounds are: dichlorodifluoromethane (commonly known as Freon 12), dichlorotetrafluoroethane (Freon 114), monochloropentafluoroethane (Freon 115), tetrachlorotetrafluoropropane (Freon 214), trichloropentafluoropropane (Freon 215), dichlorohexafluorocyclobutane (C316), octafluorocyclobutane (C318), trifluorotrichloroethane (Freon 113) and perfluorodimethylcyclobutane. Other Freons such as tetrafluoromethane may be used from the energy production standpoint but they probably would have to be used as a compressed gas because of their low critical temperature. For this reason they would be too bulky for some applications. With respect to the energy producing utility of the higher molecular weight oxidizer compounds defined above, I have found that although the heat of formation of these compounds does increase with the molecular weight, the concurrent increase in the total number of fluorine atoms per molecule compensates and there is no deleterious effect on the heat of reaction with molten lithium or sodium. Therefore, there is no foreseeable upper limit on the permissible number of carbon atoms in the oxidizer molecule (the value of $x$), at least below about 8–10. As a practical matter, however compounds of this type containing more than 8 carbon atoms currently are not commercially available.

As described above in connection with FIGURES 1 and 2, the oxidizer preferably is contained in a suitable cylinder as a liquefied gas. As it is released from the cylinder into the molten lithium or sodium, it vaporizes and undergoes reaction with the molten metal to form the respective alkali metal halides and graphite or lithium carbide depending on the exact composition of the oxidizer and fuel. If the lithium or sodium should contain an oxide film on its surface prior to melting, the alkali metal carbonate probably would be formed. This reaction system of the molten lithium or sodium and certain specific oxidizers provides a heat source for a closed cycle thermal engine which may be operated at high temperatures and low pressures creating no disposal problem with respect to the byproducts of the reaction. The heat of the reaction is sufficient to provide a reaction product at a temperature suitable for efficient operation of such closed system thermal engines as a Stirling engine or a gas turbine engine.

While my invention has been described in terms of a few specific embodiments, it will be apparent to one skilled in the art that it might be readily adopted in many other forms and therefore the scope of my invention should be considered limited only by the following claims.

I claim:

1. In combination, a closed cycle heat engine containing a working fluid, a combustion system heat source, and heat transfer means operable to conduct heat energy from said combustion system to said working fluid, said combustion system being capable of heating said working fluid to a temperature above about 1000° F. suitable for the efficient operation of said engine; said combustion system being comprised of a molten alkali metal fuel taken from the group consisting of lithium and sodium; an oxidizer containing reactive fluorine atoms in the molecule, said oxidizer being comprised of one or more of the materials taken from the group consisting of $C_xCl_yF_z$, wherein $x$, $y$, and $z$ are integers, $x$ having a value in the range of from 1 through 10, $y$ having a value of zero or greater, $z$ being always equal to or greater in value than $y$ but never zero and the value of $y$ plus $z$ being consistent with the value of $x$ in alkane and cycloalkane type organic compounds; and means to add said oxidizer to said fuel in the gaseous state in a controlled quantity whereby the heat generating combustion reaction may occur, the reaction products of said combustion system being nongaseous and such that said combustion system operates at nearly constant volume.

2. In combination, a closed cycle heat engine containing a working fluid and a combustion system heat source, said engine having heat receiving members in communication with said working fluid and a housing containing said heat receiving members, said combustion system being comprised of molten alkali metal fuel contained in said housing, said alkali metal taken from the group consisting of lithium and sodium, a gaseous oxidizer containing reactive fluorine atoms in the molecule, said gaseous oxidizer being comprised of one or more of the materials taken from the group consisting of $C_xCl_yF_z$, wherein $x$, $y$, and $z$ are integers, $x$ having a value in the range of from 1 through 10, $y$ having a value of zero or greater, $z$ being always equal to or greater in value than $y$ but never zero, and the value of $y$ plus $z$ is consistent with the value of $x$ in alkane or cycloalkane type organic compounds, and means to inject said oxidizer into said housing to react with the molten alkali metal fuel and liberate heat maintaining the temperature in said housing at a suitable value above about 1000° F., the total amount of said oxidizer being less than a stoichiometric amount with respect to said metal fuel, the reaction products of said combustion system being nongaseous and such that said combustion system operates at nearly constant volume.

3. In combination, a closed cycle heat engine employing a working fluid and a combustion system heat source to provide heat energy for the working fluid of said heat engine, said engine in operation having a heat exchanger through which said working fluid flows and is heated, said engine having a housing containing said heat exchanger, said combustion system being capable of heating said working gas to a temperature above about 1000° F.; said combustion system being comprised of molten alkali metal fuel contained in said housing, said alkali metal being taken from the group consisting of sodium and lithium; an oxidizer comprised of one or more of the materials taken from the group consisting of $C_xCl_yF_z$, wherein $x$, $y$, and $z$ are integers, $x$ having a value in the range of from 1 through 10, $y$ having a value of zero or greater, $z$ being always equal to or greater in value than $y$, but never zero, and the value of $y$ plus $z$ being consistent with the value of $x$ in alkane and cycloalkane type organic compounds; and means to inject said oxidizer in the gaseous state into said housing to react with said molten alkali metal fuel and liberate heat maintaining the temperature around said heat exchanger at a suitable substantially constant value above about 1000° F., the reaction products of said combustion system being nongaseous and such that said combustion system operates at nearly constant volume.

4. In combination, a Stirling cycle engine containing a heater tube, a working fluid flowing through said heater tube during the operation of said engine, and a housing enclosing said heater tube; and a combustion system which is operable to heat the working gas of said Stirling engine to a temperature in the range of about 1200° F. to 1600° F., said combustion system comprised of an alkali metal fuel contained in said housing, said alkali metal being taken from the group consisting of lithium and sodium; preheating means in said housing to melt said alkali metal prior to engine operation, a gaseous oxidizer containing reactive fluorine atoms in the molecule, said gaseous oxidizer being comprised of one or more of the materials taken from the group consisting of $C_xCl_yF_z$, wherein $x$, $y$, and $z$ are integers, $x$ having a value in the range of from 1 through 10, $y$ having a value of zero or greater, $z$ being always equal to or greater in value than $y$, but never zero, and the value of $y$ plus $z$ being consistent with the value of $x$ in alkane and cycloalkane type organic compounds, means to add said oxidizer to said housing in controlled amounts to react with said molten alkali metal fuel and liberate heat while maintaining the temperature about said heater tube at a suitable substantially constant value in said range, the reaction products of said combustion system being nongaseous and such that said combustion system operates at nearly constant volume.

5. A method of heating the working gas in a closed cycle external combustion heat engine to an elevated temperature above about 1000° F., said method comprised of passing said working gas through a bath of molten alkali metal fuel, said alkali metal being taken from the group consisting of lithium and sodium, while reacting said molten alkali metal with a gaseous oxidizer containing reactive fluorine atoms in the molecule, said gaseous oxidizer being comprised of one or more of the materials taken from the group consisting of $C_xCl_yF_z$, wherein $x$, $y$, and $z$ are integers, $x$ having a value in the range of from 1 through 10, $y$ having a value of zero or greater, $z$ being equal to or greater in value than $y$, but never zero and the value of $y$ plus $z$ being consistent with the value of $x$ in alkane and cycloalkane type organic compounds, the density of the combustion products of said reaction being such that the volume of said molten bath remains substantially the same, the temperature of said reaction mixture being controlled by the rate of addition of said fluorine-containing compound to said molten alkali metal.

References Cited

UNITED STATES PATENTS

| | | | |
|---|---|---|---|
| 3,010,815 | 11/1961 | Pierce et al. | 149—22 |
| 3,112,608 | 12/1963 | Bridgforth | 60—216 |
| 3,158,993 | 12/1964 | Hodgson | 60—216 X |
| 3,158,994 | 12/1964 | Hodgson | 149—37 X |
| 3,163,113 | 12/1964 | Davis et al. | 149—44 X |

MARTIN P. SCHWADRON, *Primary Examiner.*

R. R. BUNEVICH, *Assistant Examiner.*